Figure 6:
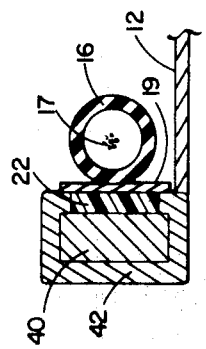

United States Patent

Sawyer

[15] 3,643,195
[45] Feb. 15, 1972

[54] MAGNETIC TAKEUP DEVICE FOR UMBILICAL CABLE OR THE LIKE

[72] Inventor: Bruce A. Sawyer, Allentown Drive, Woodland Hills, Calif. 20120

[22] Filed: Nov. 17, 1969

[21] Appl. No.: 877,246

[52] U.S. Cl. .................................335/285, 335/286, 191/12
[51] Int. Cl. ...........................................................H01f 7/20
[58] Field of Search ....................191/12; 335/302, 303, 285, 335/286, 287; 33/1 M; 174/69; 318/38

[56] References Cited

UNITED STATES PATENTS

| | | | |
|---|---|---|---|
| 3,024,325 | 3/1962 | Waninger | 191/12 C |
| 3,229,030 | 1/1966 | Baermann | 335/303 |
| 3,457,482 | 7/1969 | Sawyer | 318/38 |

FOREIGN PATENTS OR APPLICATIONS 1,345,760  10/1963  France ..................................191/12 C Primary Examiner—G. Harris
Attorney—Smyth, Roston & Pavitt

[57] ABSTRACT

An umbilical feed cable runs from equipment which may include electrical controls, pneumatic sources or the like to a device such as a plotting head which is to be variously positioned. The cable has a flexible band of magnetic material attached thereto running along substantially its entire extensible length. Positioned in a desired takeup location is a magnetized strip. An end of the band of magnetic material is attached to an end portion of this strip. As the device is moved about, the band is magnetically drawn against the magnetic strip to take up any slack which may appear therein.

24 Claims, 8 Drawing Figures

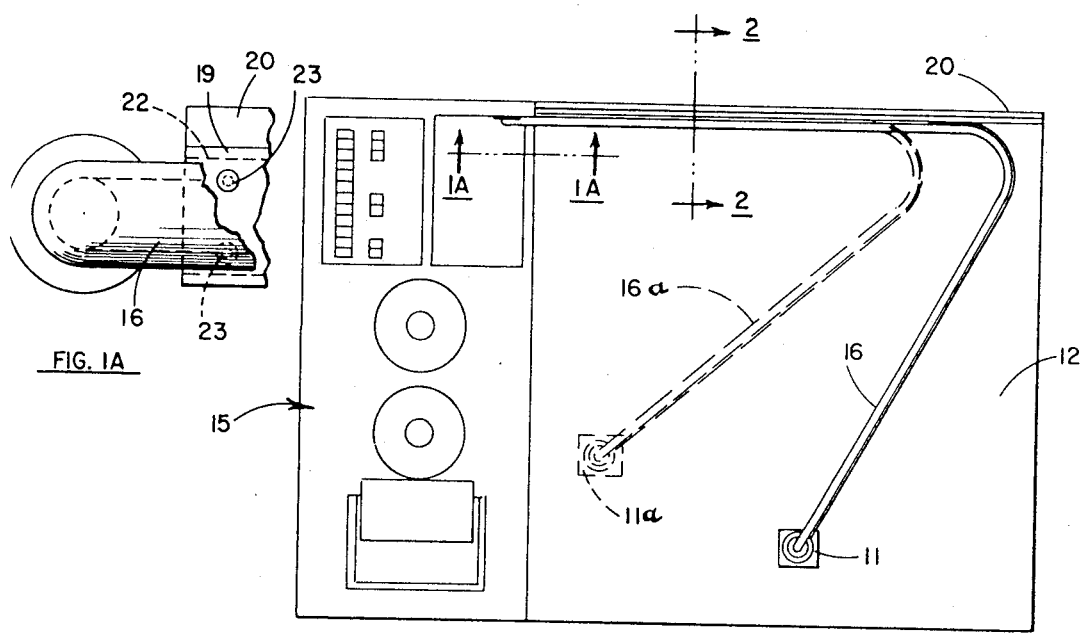
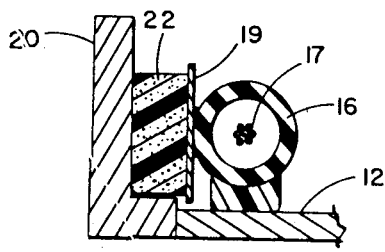
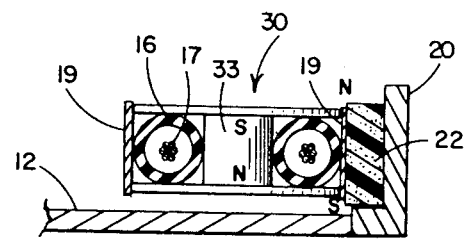
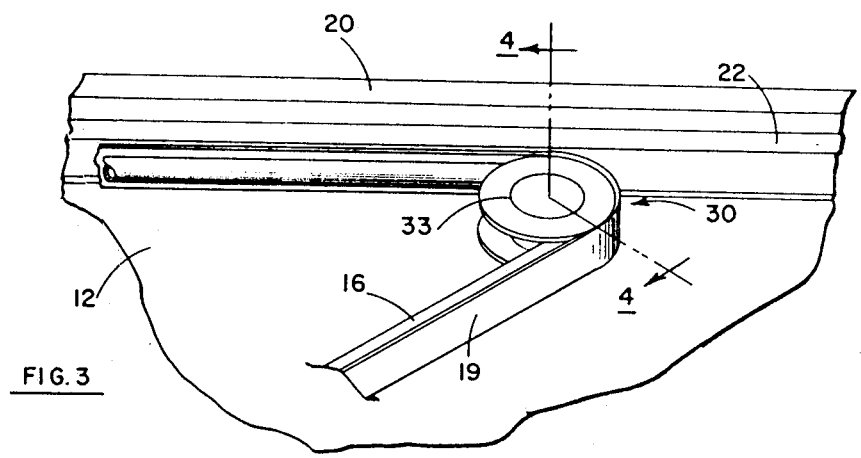
INVENTOR
BRUCE A. SAWYER
BY
SOKOLSKI & WOHLGEMUTH
ATTORNEYS 3,643,195

SHEET 2 OF 2

INVENTOR
BRUCE A. SAWYER
BY
SOKOLSKI & WOHLGEMUTH
ATTORNEYS

MAGNETIC TAKEUP DEVICE FOR UMBILICAL CABLE OR THE LIKE

This invention relates to cable takeup devices, and more particularly, to such devices in which magnetic force is utilized to implement the takeup operation.

In plotting devices such as described, for example, in my U.S. Pat. No. 3,457,482, issued July 22, 1969, for a magnetic positioning device, the marking tool is moved by means of a head member on a plotting surface. Electrical control signals must be fed to and from the head to implement its plotting operation, as well as a pressurized air supply to establish an air bearing for the head. These signals are fed to the head through a feed cable or umbilical. As the head traverses back and forth across the plotting table, the umbilical, if left loose, can become tangled or snagged. This, of course, could cause damage to the cable which would interrupt the operation of the system, and also could result in a drag load being placed on the head which could cause an error in the positioning of such head. It is therefore highly desirable to provide means for taking up any slack which may appear in the umbilical, at the same time permitting the cable to feed out freely with the movements of the head.

Various types of reel in devices, many of the spring driven type, are available in the prior art for implementing this end result. These are often, however, overly more complicated, expensive, and cumbersome in their operation and construction than would be desired. Other prior art cable feed devices involve overhead suspensions which are somewhat space consuming, cumbersome, and unsightly.

The device of this invention provides a simple yet highly effective mechanism involving a minimum number of parts which effectively feeds out the cable and takes up any slack therein with a minimum loading of the head to which it is coupled. The device of the invention further is of highly economical construction, and in view of its simplicity has inherent high reliability.

It is therefore the principal object of this invention to provide a very simple yet highly efficient and reliable mechanism for providing feed and takeup of a cable coupled to a positionable member such as a plotting head.

Other objects of the invention will become apparent as the description proceeds in connection with the accompanying drawings of which, FIG. 1 is a plan view of a first embodiment of the device of the invention, FIG. 1A is an elevational view taken along the plane indicated by 1A—1A in FIG. 1.

FIG. 2 is a cross-sectional view taken along the plane indicated by 2—2 in FIG. 1.

Figure 5:
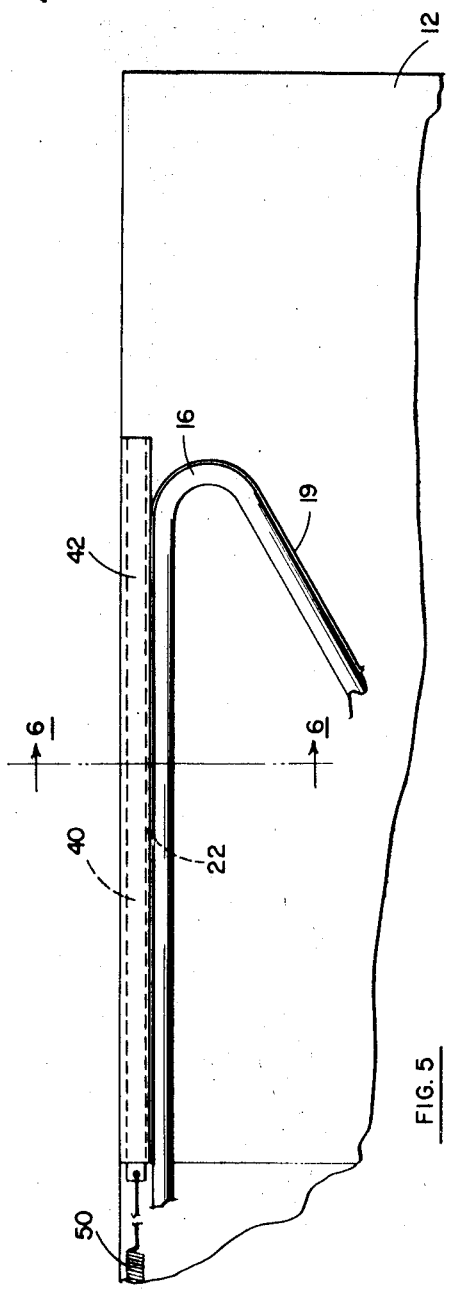
Figure 7:
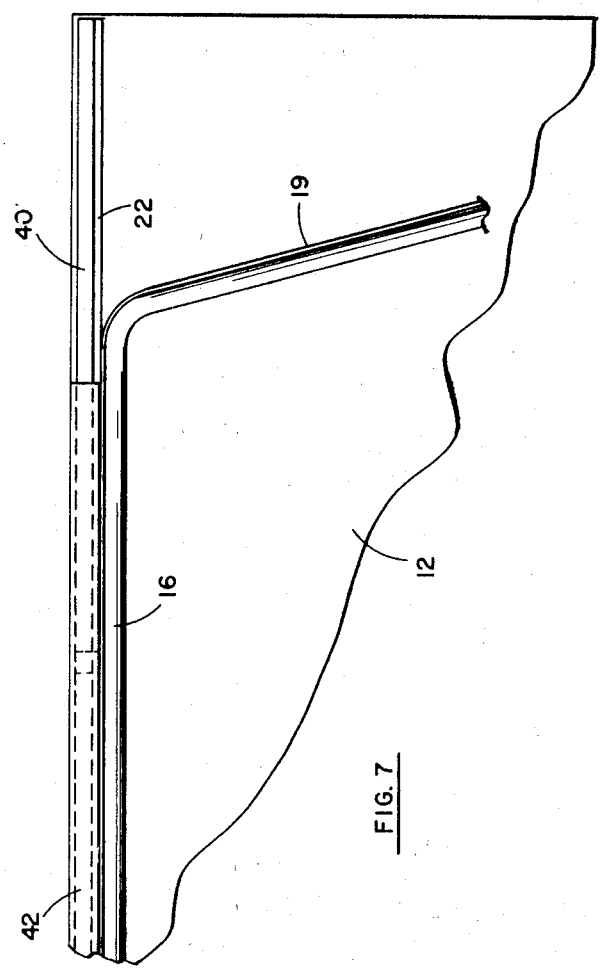

FIG. 3 is a perspective view illustrating a second embodiment of the device of the invention utilizing a magnetic idler spool, FIG. 4 is a cross-sectional view taken along the plane indicated by 4—4 in FIG. 3, FIG. 5 is a plan view illustrating an embodiment of the device of the invention utilizing a slidable magnetic strip, FIG. 6 is a cross-sectional view taken along the plane indicated by 6—6 in FIG. 5, and FIG. 7 is a view of the embodiment of FIG. 5 showing the magnetic strip in an extended position.

Briefly described, the device of the invention comprises a cable or umbilical which is connected at one end to a member which is to be variously positioned on a surface. The cable has magnetic material along substantially the entire extensible length thereof which in the disclosed embodiments is in the form of a flexible band. A magnetized strip is positioned in a location where it is desired that the cable be taken up when there is slack therein. An end of the cable attached band is mechanically fastened against the magnetized strip. The magnetic band is thus attracted to the magnetized strip to take up any slack which may appear in the cable.

Referring now to FIGS. 1 and 2 a first embodiment of the device of the invention is illustrated. Member 11, which may comprise a magnetic positioning head as described in my U.S. Pat. No. 3,457,482, is driven along the surface of platen member 12 in response to control signals fed thereto from control device 15 on cable 16. The platen member 12 may have a planar configuration and the head member is movable along the planar configuration of the platen member to any position along the first and second coordinate axes. Head member 11 may include a marking tool which plots information on a sheet of paper located on platen 12. Cable 16, as can be seen, must be free to follow head 11 as it moves about on the platen. A second position, for example, for the cable and head is shown in dotted outline.

Cable 16 as shown in FIG. 4 has a plurality of electrical control leads 17 contained therein and also serves as a pneumatic line for providing an air stream for an air bearing utilized to support head 11. Fixedly attached to cable 16 and running along substantially the entire extensible length thereof is a band 19 of a highly magnetic material such as steel. Band 19 may be attached to the outer wall of cable 16 by cementing. It is to be noted that in lieu of band 16 other types of implementations for providing magnetic material along the cable may be provided, such as for example the use of a cable having a sheath of magnetic material. Platen 12 has a L-shaped bracket 20 fixedly attached thereto and running along its edge. Fixedly attached to bracket 20 is a strip 22 of permanently magnetized material, this strip being attached to the bracket, for example, by cementing. Strip 22 may be of a plastic material having a magnetized powder molded therein. An end of band 19 is tacked to strip 22 and bracket 20 by means of rivets 23 or screws as shown in FIG. 1A, the cable 16 continuing on to the control equipment 15 and the pneumatic source (not shown).

As can be seen in FIG. 1, the portions of cable 16 not needed to extend out to head 11 are held against magnetic strip 22, out of the way along the edge of platen 12 with magnetic band 19 lying flatly against strip 22. As the head is positioned and moved for example to the position indicated in dotted form (head designated 11a and cable 16a) cable 16 is effectively "peeled" off from magnetic strip 22. When the head returns to the original position, the slack in the cable is taken up by virtue of the magnetic attraction of the magnetized strip for the steel band which draws the band thereagainst. Thus, the cable is kept in a straight unraveled condition for all plotting positions. At the same time, the magnetic holding force is not so great as to place any undue restraint on the cable so that it is freely fed out with various diverse movements of the head.

Referring now to FIGS. 3 and 4 a second embodiment of the invention is illustrated. This embodiment is similar to the first except for the addition of a magnetized idler spool to facilitate the take up of the cable alongside the magnetized strip. Spool member 30 has a permanent magnet 33 at the center thereof. The spool is positioned with the cable 16 wound therearound and so that it is pinning the cable against the surface of magnetic strip 22 as indicated in FIG. 4. The spool is oriented with the north and south poles of magnet 33 facing the opposite poles of magnetized strip 22, as shown in FIG. 4, wherein the north and south poles of the magnet and the strip are designated. Thus, the edges of spool 30 are magnetically attracted towards the surface of strip 22. The spool thus acts as an idler which effectively pins band 19 against strip 22 as the band comes into contact with the strip, by increasing the normal force at this initial contact point. The idler also serves to keep the loop in the cable formed at the contact point with the magnetized strip well defined at all times so as to avoid undue bending of the cable.

Referring now to FIGS. 5–7 another embodiment of the device of the invention is illustrated. This embodiment is similar to that of FIGS. 1 and 2 except for the fact that the magnetic strip is mounted in a slidable support so that it can draw the cable away from the edge of the platen for certain positions of the head. This is useful to prevent the hanging of the cable over the edge of the platen in such situations. This is particularly significant where there is no table portion extending beyond the platen to provide a support for the cable.

Magnetized strip 22 is attached to slider bar 40 which is slidably supported in channel 42. Channel 42 is fixedly attached to the edge of platen 12. The end of bar 40 is attached to a light spring 50, the opposite end of spring 50 being attached to platen 12. Slider bar 40 and magnetized strip 22, which is attached thereto, are thus free to move longitudinally along with cable 16. Thus, as shown in FIG. 7, when the cable 16 is extended towards the edge of platen 12 for particular positions of the head, the magnetic strip 22 extends longitudinally along with it to hold it in position and prevent it from hanging over the edge of the platen.

The device of this invention thus provides simple yet highly effective means for feeding and taking in the slack of a feed cable or umbilical, such as might be used for a plotting head. Takeup is provided to keep the cable in a proper position to prevent raveling thereof. At the same time, feed is provided with a minimum restraint on the cable, thus avoiding loading of the head which might adversely affect the operation thereof.

I claim:

1. In a device for feeding and taking up a cable or the like, magnetic material running along said cable over substantially the entire extensible length thereof,
a platen having a planar configuration defined by first and second coordinate axes,
a member to be variously positioned along said platen, the member being connected to said cable at one end of said cable, the member being movable to any desired position along said platen on first and second coordinate axes, and
a magnetized strip located in a position at one edge of the platen where said cable is to be taken up, the magnetized strip being attached to the platen along the one edge of the platen,
the cable being attached to the magnetized strip at the opposite end of the cable,
the magnetic material in said cable being magnetically attracted by said magnetized strip so as to take up said cable and remove any slack which may appear therein.

2. The device of claim 1 wherein said magnetic material comprises a band fixedly attached to said cable.

3. The device of claim 1 wherein electrical leads extend through said cable to said member to introduce electrical energy to said member for controlling the movement of said member and wherein the cable is hollow to provide for the introduction of a hydrostatic force through the cable to maintain the member in spaced relationship to the platen.

4. The device of claim 1 and further including a magnetized idler member, said cable being wound on said idler member, said idler member being magnetically attracted towards the face of the magnetized strip to pin the cable to the strip as it is brought proximate thereto.

5. The device of claim 1 and further including means for slidably supporting the strip so that it is axially movable as the cable is extended.

6. In combination,
a platen having a planar configuration defined by first and second coordinate axes,
a head member disposed in contiguous relationship to the platen and constructed to be moved along said platen to any desired position defined by said first and second coordinate axes,
a cable having first and second opposite ends and attached to the head member at the first end for providing control signals thereto, and
means for feeding and taking up said cable as said head member is positioned along said platen, including,
a flexible band of magnetic material attached to said cable and extending along substantially the entire extensible length thereof,
a magnetized strip,
said strip being attached to the platen along an edge of the platen,
the end of said band remote from said head member being attached to said strip,
whereby portions of said cable are attracted to said magnetized strip and held thereagainst to remove slack from said cable and permitted to peel from said strip in response to the displacement of the head member to different positions along the platen.

7. The device of claim 6 and further including magnetic idler means for pinning said magnetic band against said strip, said idler means rolling along the surface of the strip with the cable riding thereon.

8. The device of claim 6 and further including means for slidably supporting said strip for longitudinal motion along the edge of the platen, thereby permitting said strip to move along a longitudinal axis with the cable.

9. The device of claim 8 and further including spring means for providing a return force for said strip to urge it towards an initial starting position.

10. In combination,
a first member having a planar configuration defined by first and second coordinate axes,
a second member disposed in contiguous relationship to the first member and movable along the planar configuration of the first member to any position along the first and second coordinate axes in accordance with the introduction of signals to the second member,
at least a pair of control leads connected to the second member to provide signals to the second member for controlling the movement of the second member,
a flexible cable enveloping the control leads and having first and second opposite ends and extending at the first end to the second member and fixedly disposed at the second end along one periphery of the first member,
first means extending along the first member at the one periphery to provide a magnetic force for taking up any slack in the cable, and
second means disposed on the cable in cooperative relationship with the first means and responsive to the magnetic force exerted by the first means to take up any slack in the cable.

11. The combination set forth in claim 10 wherein the flexible cable is constructed to provide for the introduction of a hydrostatic force through the cable to maintain the second member in spaced relationship to the first member.

12. The combination set forth in claim 11 wherein the second means include idler means movable along the first means to facilitate the taking up of slack in the cable.

13. The combination set forth in claim 10 wherein the first and second means are constructed with magnetic properties to exert a magnetic force on each other and wherein the first means comprises a permanent magnet.

14. In combination,
a first member having a planar configuration defined by first and second coordinate axes,
a second member disposed in contiguous relationship to the first member and movable along the planar configuration of the first member to any position along the first and second coordinate axes in accordance with the introduction of signals to the second member,
a flexible cable having first and second opposite ends and attached at the first end to the second member and at the second end to the first member and disposed in a particular relationship to the first member in the portion adjacent to the second end and extending in a closed loop in the portion adjacent to the first end,
leads extending through the cable and connected to the second member to introduce signals to the head for positioning the head relative to the first member,
first means having magnetic properties and disposed on the first member at a position corresponding to the particular relationship between the cable and the first member at the portion adjacent to the second end of the cable, and
second means disposed on the cable and having magnetic properties and providing an attractive magnetic force in cooperation with the first means to maintain the portion adjacent the second end of the cable in the particular relationship relative to the first member and to take up any slack in the looped portion of the cable.

15. The combination set forth in claim 14 wherein one of the first and second means includes a permanent magnet and the other one of the first and second means includes a magnetic member responsive to the permanent magnet to become attracted by the permanent magnet.

16. The combination set forth in claim 14 wherein the flexible cable is hollow to provide for the introduction of fluid through the cable to facilitate the disposition of the second member in floating relationship to the first member.

17. The combination set forth in claim 15 wherein the second means include idler means having magnetic properties for cooperating with the first means to facilitate the taking up of slack in the cable.

18. The combination set forth in claim 16 wherein the first means include a strip movable in a direction corresponding to the particular disposition of the cable relative to the first member, such movement occurring in accordance with the movements of the second member relative to the first member, and wherein a spring is attached to the strip to assure proper disposition of the strip in accordance with the movements of the second member relative to the first member.

19. In the device set forth in claim 1,
   the magnetic material running on a continuous basis along said cable over the entire extensible length thereof and the magnetized strip being provided with magnetized properties along the continuous length of the strip.

20. In the device set forth in claim 3,
   the magnetic material running on a continuous basis along said cable over the entire extensible length thereof and the magnetized strip being provided with magnetized properties along the continuous length of the strip.

21. In the device set forth in claim 6,
   the strip being continuously magnetized along its length and the flexible band of magnetic material extending continuously along the cable.

22. The combination set forth in claim 13 wherein the first means extends continuously along the first member at the one periphery to provide the magnetic force and the second means is disposed on the cable continuously along the length of the cable.

23. The combination set forth in claim 14 wherein the first means is disposed on the first member continuously along the length of the first member and the second means is disposed on the cable continuously along the length of the cable.

24. The combination set forth in claim 16 wherein the first means is disposed on the first member continuously along the length of the first member and the second means is disposed on the cable continuously along the length of the cable.

* * * * *